United States Patent
DuBois

(10) Patent No.: US 8,155,288 B2
(45) Date of Patent: Apr. 10, 2012

(54) TEMPLATE PROCESSING SYSTEM AND METHOD

(75) Inventor: Charles L. DuBois, Rochester, NY (US)

(73) Assignee: FUJIFILM North America Corporation, Valhalla, NY (US)

( * ) Notice: Subject to any disclaimer, the term of this patent is extended or adjusted under 35 U.S.C. 154(b) by 1335 days.

(21) Appl. No.: 11/673,322

(22) Filed: Feb. 9, 2007

(65) Prior Publication Data

US 2007/0200844 A1    Aug. 30, 2007

Related U.S. Application Data

(60) Provisional application No. 60/776,769, filed on Feb. 24, 2006.

(51) Int. Cl.
*H04M 11/00* (2006.01)

(52) U.S. Cl. ............... 379/93.25; 379/90.01; 379/93.05; 715/235; 715/517

(58) Field of Classification Search ............... 379/93.25, 379/90.01, 93.05–93.07; 235/379–381; 709/203, 709/206, 217, 246; 715/235, 517; 700/233
See application file for complete search history.

(56) References Cited

U.S. PATENT DOCUMENTS

| | | | |
|---|---|---|---|
| 6,891,539 B1 * | 5/2005 | Maruyama et al. | 345/629 |
| 7,290,705 B1 * | 11/2007 | Shin | 235/381 |
| 2003/0084055 A1 * | 5/2003 | Tanaka | 707/100 |
| 2004/0205138 A1 * | 10/2004 | Friedman et al. | 709/206 |
| 2005/0262437 A1 * | 11/2005 | Patterson et al. | 715/517 |

* cited by examiner

*Primary Examiner* — Melur Ramakrishnaiah
(74) *Attorney, Agent, or Firm* — Woods Oviatt Gilman LLP

(57) ABSTRACT

A system and method for processing digital templates having one or both of a pre-filled image and text field. Optional image and/or text fields are provided for filling in by the customer using customer-selected data. As the customer adds text and images to the template, a data file is created having an indication of the template style selected as well as the optional data fields filled in by the customer including one or more of the location, orientation, size and font thereof. The data file is transmitted to a photofinisher which has access to a high resolution copy of the template, which is populated by the data in the data file to create the finished template print. Since only the data file is transmitted to the photofinisher, the file size is kept to a relative minimum and is thus relatively quick and easy to transmit to the photofinisher.

24 Claims, 3 Drawing Sheets

TEMPLATE PROCESSING SYSTEM AND METHOD

CROSS-REFERENCE TO RELATED APPLICATIONS

This application claims the benefit of U.S. Provisional Patent Application Ser. No. 60/776,769, filed Feb. 24, 2006.

FIELD OF INVENTION

The present invention relates to digital image processing, and more particularly relates to a digital image template processing system and method.

BACKGROUND OF THE INVENTION

In one exemplary prior art template processing system, it is known to provide a variety of template styles of low resolution to a customer on their home computer or a photo kiosk, for example. The templates have pre-existing images and/or text thereon with one or more open fields for the addition of customer image and/or text data therein for customizing the template into a finished print. Customized holiday greeting cards made this way have become popular in recent years. An example of this type of prior art template processing system is illustrated in FIG. 1 where a customer selects a low resolution template "x" indicated by reference numeral 10. A pre-existing image field 12 includes a star and a pre-existing text field 14 includes the words "Happy Holidays." An open text field 1 labeled 16 is filled in by the customer and in this example, is filled with the words, "The Smith Family." An open image field labeled 18 is also filled by the customer by pasting or otherwise attaching a digital image therein, in this example a picture of the family. Once the template 10 has been filled out, the customer sends the order to the photofinisher over the internet or at a kiosk, for example. The order is in the form of a data file containing the template number and the customer-specified text and image data. The photofinisher accesses a high resolution file of the specified template and populates the open text and image fields thereof with the data file transmitted by the customer. The photofinisher may then print and ship or otherwise make the order available to the customer.

While the foregoing prior art template image processing system is adequate for its purpose, it is lacking in the ability to allow the customer to make any modifications they desire. For example, a customer may wish to add further text and images to the template at various locations and orientations. Present day template processing systems cannot accept any modifications beyond the pre-existing image and data fields in their specified locations on the template.

It would therefore be desirable from a customer satisfaction standpoint to provide a template processing system which allows a customer to make virtually unlimited image and text modifications thereto while also keeping the transmitted data file size as small as possible.

SUMMARY OF THE INVENTION

The present invention successfully addresses the above need by providing a digital template processing system and method which allows a user to make image and text modifications to a selected template. As the customer adds images and text to the template appearing on the screen, a data file is created which includes the image and/or text and the respective locations thereof on the template. Further information may be automatically added to the data file such as one or more of the orientation, size and font, for example. Once complete, the order is transmitted to the photofinisher via internet or kiosk, for example. The photofinisher receives the order with the data file giving all information needed to create high resolution prints of the customer's customized template. Since the photofinisher has all available templates in high resolution format, there is no need for the customer to transmit the template itself which is of a large file size. The customer is thus transmitting only the modifications as a data file, thereby minimizing the transferred file size.

BRIEF DESCRIPTION OF THE DRAWINGS

The above-mentioned and other features and advantages of this invention, and the manner of attaining them, will become apparent and be better understood by reference to the following description of the invention in conjunction with the accompanying drawing, wherein.

DETAILED DESCRIPTION OF THE INVENTION

Figure 2:
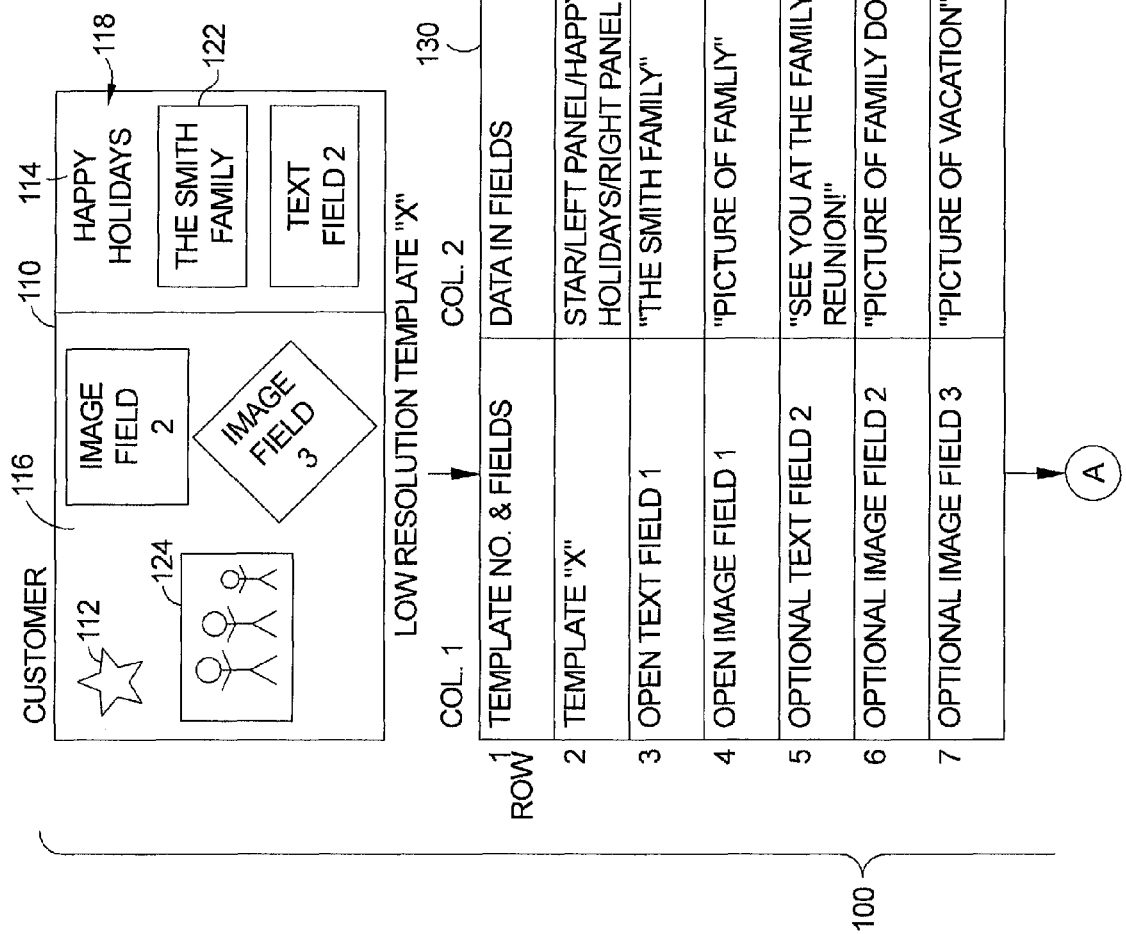
FIG. 2 is a simplified block diagram of an embodiment of the inventive template processing system and method.
Figure 2:
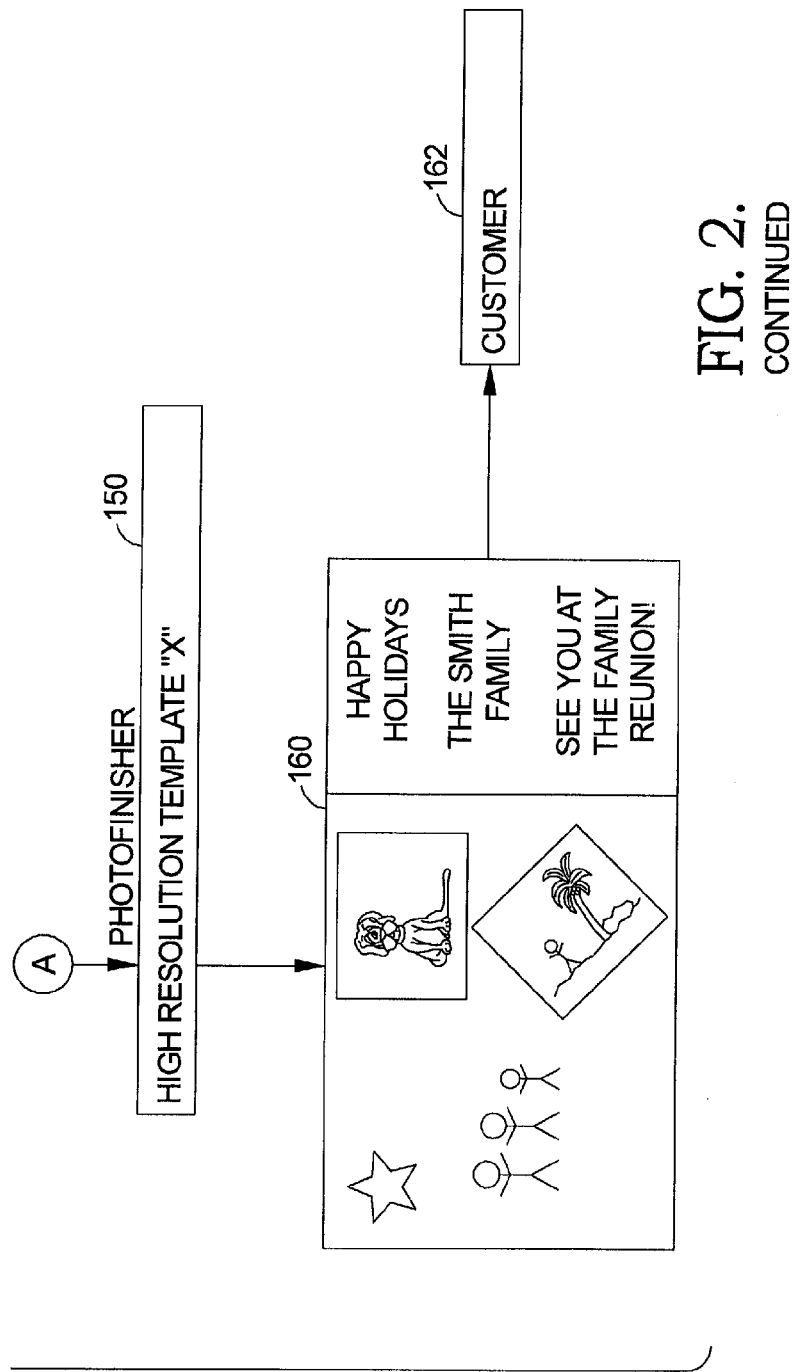

An exemplary embodiment of the present invention is illustrated in FIG. 2. The specific template and image and text data provided in FIG. 2 is for purposes of description only. It is therefore understood that the invention is not to be limited thereby, but is instead applicable to a variety of specific applications.

As best seen in FIG. 2, the inventive template processing system is indicated generally by the reference numeral 100. System 100 may be embodied in a computer-readable medium or program having a set of computer-executable instructions for carrying out or performing the indicated digital image processing. The digital image processing of the present invention may be performed under the control of a user alone, a photofinishing service alone, or through communication and steps performed by both a customer and a photofinisher.

The template processing begins by a customer selecting a template style such as a template "x" labeled 110 in FIG. 2. Template 110 is a holiday greeting card having a line 112 dividing the card into right and left panels 114 and 116, respectively. A pre-existing or pre-filled text field 118 including, for example, "Happy Holidays" may appear in the upper half of right panel 114 while a pre-existing or pre-filled image field including, for example, a star 120 may appear in the upper left corner of left panel 116. The template 110 offers the customer an open text field 122 to fill in with their choice of words, for example, "The Smith Family;" as well as an open image field 124 to fill in with their choice of an image, for example, a family picture. It should be understood that the term "open" in open text field and open image field can be defined in such a manner that no text or image is located in the field prior to the customer filling in their choice of text or images, respectively. In the alternative, the term "open" may also be defined such that text or one or more images are located within the field prior to the customer filling in their choice of text or images, respectively. For example, the phrase "Enter Text Here" may be located within one or more of the open text fields prior to the customer filling in their choice of text to alert the customer that such a text addition may be made or otherwise populated to the template.

Figure 1:
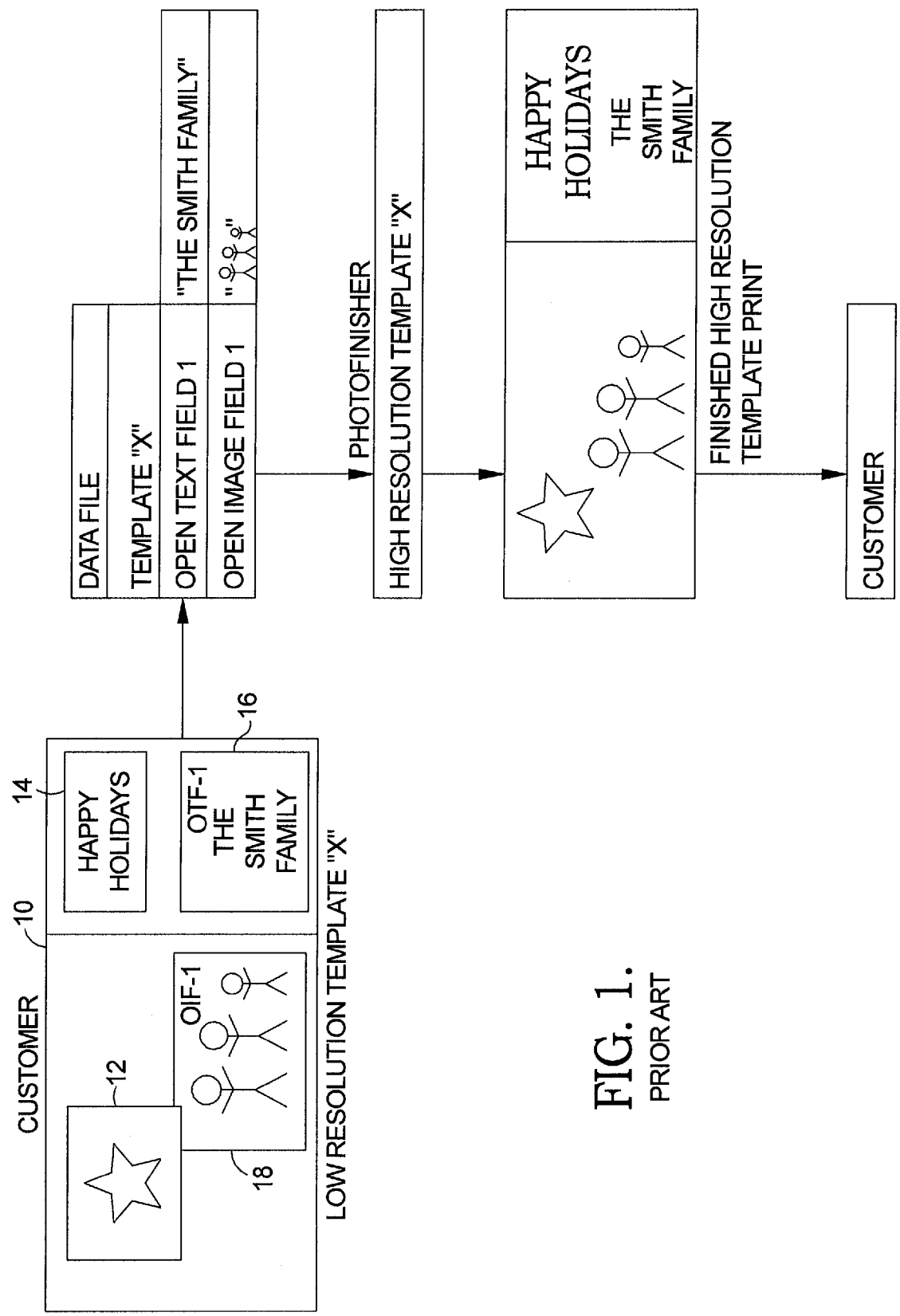
FIG. 1 is a simplified block diagram of a prior art template processing system.

Up to this point, template 110 is constructed and appears virtually the same as the prior art template 10 of FIG. 1.

However, in the inventive template processing system 100, the customer may continue to make as many modifications as they desire. As the customer makes further modifications, a data file 130 is created having all relevant modification information therein for transfer to the photofinisher at block 150.

In the example shown in FIG. 2, the customer has moved the open image field 124 to the left lower quadrant "LLQ" in the left panel and has kept the image upright (i.e., straight or "ST") as indicated at row 4, column 3 of the data file 130. The customer has also added an additional text field 2 in the lower right quadrant "LRQ" of the right panel 114 as indicated at row 5, columns 1-3 of data file 130. The customer has also added further image fields 2 and 3 in the left panel 116 as indicated at rows 6 and 7, columns 1-3 of the data file 130. The customer has rotated image field 3 forty-five degrees clockwise "CW" and this information is included at row 7, column 3 of the data file 130. Further information concerning the data may be provided in the data file 130 as desired, for example, font and size as indicated at columns 4 and 5. It will be appreciated that as the customer makes modifications to template 110, data file 130 is created. The customer may never need to see the data file since it is simply a set of instructions for creating a high resolution copy of the low resolution template 110 as filled out and further customized by the customer.

It is envisioned that the templates, such as template 110, do not have a pre-set number of images or text fields that can be added thereto. Rather, system 100 allows the customer to move, modify, add and delete images and text on any given template as desired. As the modifications are made by the customer, system 100 "builds" the data file containing all modification instructions. The data file is then transmitted to the photofinisher in any desired manner such as using a wireless transmission directly from a personal computer, photo kiosk, or the like. In addition, it will be understood and appreciated that the photofinisher computer system may be in a location that is local or remote from the location in which the photo print orders are processed.

Since the data file 130 does not include a high resolution copy of the template, the data file size is kept to a minimum and the electronic transfer to the photofinisher is relatively quick and easy. Once received by the photofinisher at block 150, the data file 130 is opened and a high resolution copy of the template as modified is constructed as indicated by reference numeral 160. The photofinisher may then ship or otherwise make the order 160 available to the customer at block 162.

It will be understood and appreciated that the method for digital image processing between a customer and a photofinisher described above may be accessible to and executed by system 100 in accordance with pre-programmed algorithms, execution instructions or sequences, computations, software code modules, interface specifications or the like. Further, the method performed by system 100 may be implemented in a computing environment such as a personal computer (PC) or other computing device. Such computer may also include a storage device including volatile and nonvolatile, removable and non-removable media implemented in any method or technology for storing information such as program modules, data structures, computer readable instructions, or other data. The computer storage media may include, but is not limited to, floppy disks, conventional hard disks read only memory (ROM), random access memory (RAM), flash memory, electrically erasable programmable read-only memory (EEPROM), or other types of memory magnetic cassettes, magnetic tape, magnetic disk storage or other magnetic storage devices, CD-ROM, digital versatile disks (DVD) or other optical disk storage, or any other medium which can be used to store the desired information and which can be accessed by system 10, 110.

System 100 may also include communication media for sending and receiving signals, instructions or other parameters between the customer and the photofinisher. Communication media typically embodies computer readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a direct wired connection, and wireless media such as acoustic, radio frequency, infrared and other wireless media. It will be understood that combinations of any of the above should also be included within the scope of computer readable media.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A digital template processing system for creating customized digital template prints, said system comprising:
   a) a first digital template including at least one pre-filled field, said first digital template including at least one open field to be populated by a customer;
   b) a data file created in response to the customer populating said at least one open field, said data file including an identification of said first digital template and at least one of the location, orientation, size and font of said at least one open field; and
   c) a second digital template corresponding to said first digital template accessible by said photofinisher, wherein said data file is sent to said photofinisher for creating said customized digital template prints using said data file and said second digital template.

2. A system in accordance with claim 1, wherein said first digital template is a low resolution digital template, and wherein said second digital template is a high resolution digital template.

3. A system in accordance with claim 1, wherein said at least one pre-filled field is either a pre-filled text field or a pre-filled image field.

4. A system in accordance with claim 1, wherein said at least one open field is either an open text field or an open image field.

5. A system in accordance with claim 1, wherein said first digital template is accessible by the customer on a home computer.

6. A system in accordance with claim 1, wherein said first digital template is accessible by the customer on a kiosk.

7. A system in accordance with claim 1, wherein said at least one open field is populated by the customer using customer-selected data.

8. A system in accordance with claim 1, wherein said data file is sent to said photofinisher electronically.

9. A system in accordance with claim 8, wherein said data file is transmitted by the customer over the internet to said photofinisher.

10. A system in accordance with claim 1, wherein at least one of the location, orientation, size and font of said pre-filled field is modified by the customer.

11. A system in accordance with claim 1, wherein said data file is created in response to the customer populating said at least one open field and the customer modifying at least one of the location, orientation, size and font of said at least one open field.

12. A system in accordance with claim 11, wherein said identification of said at least one of the location, orientation, size and font of said at least one open field included in said data file is made after the modification of said at least one of the location, orientation, size and font of said at least one open field.

13. A method of processing a digital template order from a customer to a photofinisher, said method comprising:
 a) providing the customer with a first digital template including at least one pre-filled field, said first digital template including at least one open field to be populated by a customer;
 b) providing a data file in response to the customer populating said at least one open field, said data file including an identification of said first digital template and at least one of the location, orientation, size and font of said at least one open field;
 c) providing a second digital template corresponding to said first digital template accessible by said photofinisher; and
 d) communicating said data file to said photofinisher for creating a customized digital template print using said data file and said second digital template.

14. A method in accordance with claim 13, wherein said first digital template is a low resolution digital template, and wherein said second digital template is a high resolution digital template.

15. A method in accordance with claim 13, wherein said at least one pre-filled field is either a pre-filled text field or a pre-filled image field.

16. A method in accordance with claim 13, wherein said at least one open field is either an open text field or an open image field.

17. A method in accordance with claim 13, wherein said first digital template is accessible by the customer on a home computer.

18. A method in accordance with claim 13, wherein said low resolution template is accessible by the customer on a kiosk.

19. A method in accordance with claim 13, wherein said at least one open field is populated by the customer using customer-selected data.

20. A method in accordance with claim 13, wherein said data file is communicated to said photofinisher electronically.

21. A method in accordance with claim 20, wherein said data file is transmitted by the customer over the internet to said photofinisher.

22. A method in accordance with claim 13 further comprising allowing the customer to modify at least one of the location, orientation, size and font of said pre-filled field.

23. A method in accordance with claim 13, wherein said data file is provided in response to the customer populating said at least one open field and the customer modifying at least one of the location, orientation, size and font of said at least one open field.

24. A method in accordance with claim 23, wherein said identification of said at least one of the location, orientation, size and font of said at least one open field included in said data file is made after the modification of said at least one of the location, orientation, size and font of said at least one open field.

* * * * *